United States Patent [19]
Newburgh

[11] 3,802,778
[45] Apr. 9, 1974

[54] APPARATUS AND METHODS UTILIZING BREWSTER ANGLE FOR DETERMINING ANGULAR VELOCITY AND LIGHT BEAM INCIDENCE ANGLES

[75] Inventor: Ronald G. Newburgh, Belmont, Mass.

[73] Assignee: The United States of America as represented by the Secretary of the Air Force, Washington, D.C.

[22] Filed: Aug. 29, 1972

[21] Appl. No.: 284,523

Related U.S. Application Data

[62] Division of Ser. No. 170,502, Aug. 10, 1971, Pat. No. 3,734,619.

[52] U.S. Cl. .................... 356/141, 356/152, 356/28, 356/118
[51] Int. Cl. .......................................... G01b 11/26
[58] Field of Search ............ 356/118, 141, 152, 28; 250/231 SE

[56] References Cited
UNITED STATES PATENTS
3,458,704    7/1969    Cath .................................. 356/141

*Primary Examiner*—Maynard R. Wilbur
*Assistant Examiner*—S. C. Buczinski

[57] ABSTRACT

A light beam linearly polarized in its plane of incidence is projected onto the peripheral surface of a rotatable refracting disc at an angle that effects absorption of all the incident light. Means for detecting reflected light are positioned proximate to the point of incidence. Angular velocity of the disc is determined by the amount of change in angle of incidence of the light beam required to eliminate any light reflected due to disc movement. Change in angle of incidence of the light beam is measured by rotating the disc to a speed that eliminates any light reflected due to such change in angle of incidence.

1 Claim, 2 Drawing Figures

APPARATUS AND METHODS UTILIZING BREWSTER ANGLE FOR DETERMINING ANGULAR VELOCITY AND LIGHT BEAM INCIDENCE ANGLES

BACKGROUND OF THE INVENTION

This is a division of application Ser. No. 170,502, now U.S. Pat. No. 3734619, filed Aug. 10, 1971, entitled APPARATUS AND METHODS UTILIZING BREWSTER ANGLE FOR DETERMINING ANGULAR VELOCITY AND LIGHT BEAM INCIDENCE ANGLES, by Ronald G. Newburgh.

This invention relates to a novel application of the Brewster angle phenomenon and particularly to apparatus and methods for determining angular velocity and light beam incidence angles.

There currently exists various applications wherein values indicating the relationship between angular rotation velocity and the angle of incidence of an impinging light beam can be put to practical use. For instance, precision calibration of rotating machinery can be accomplished by such a technique. Also remote monitoring of rotating devices such as may be employed in dangerous environmental test situations can advantageously be accomplished by means of Brewster angle devices. In the field of space navigation, the attitude relationship of a moving space vehicle with a light beam reference would be necessary information for successful guidance. Satisfactory means for acquiring such information are not now available. Accordingly, the present invention is directed toward providing methods and means for accomplishing these and other ends.

SUMMARY OF THE INVENTION

The essential elements of the device of the present invention consists of a rotatable disc of refracting material, a light source capable of projecting a light beam that is linearly polarized in its plane of incidence, and means for detecting light reflected from the disc. In order to practice the invention as a means for measuring angular velocity the light beam is directed onto the periphery of the disc (while the disc is stationary) at an angle that produces no reflection. The disc is then rotated causing the Brewster angle conditions to be violated and concomitant reflection of the light beam. The light source is then moved to again achieve a no reflection condition. The amount of movement of the light source required to accomplish this is a direct measure of the angular velocity of the disc.

Determination of a change in angle of incidence of the light beam from an established reference angle is accomplished in a reverse manner. The disc (in a stationary condition) is initially positioned to intercept the light beam at the Brewster angle (no reflected light). Any detected reflected light by the light detecting means indicates a change in angle of incidence of the light beam. The disc is then rotated to a velocity that eliminates the reflected light. The disc velocity is measured and is a direct indication of the change in angle of incidence of the light beam.

It is a principal object of the invention to provide new and improved methods and means for relating the angular velocity of a rotatable disc to the angle of incidence of a light beam impinging thereon.

It is another object of the invention to provide new and improved methods and apparatus for measuring the angular velocity of rotating members.

It is another object of the invention to provide new and improved methods and apparatus for measuring the attitude deviation of a moving vehicle from a fixed reference light beam.

These, together with other objects, advantages and features of the invention, will become more apparent from the following detailed description when taken in conjunction with the illustrative embodiment in the accompanying drawings.

DETAILED DESCRIPTION OF THE PREFERRED EMBODIMENT

If a ray linearly polarized in a plane of incidence is incident on a refractive medium at an angle whose tangent equals the relative index of refraction, there is no reflected ray and the refracted ray is perpendicular to the would-be reflected ray. This particular angle of incidence is called the Brewster angle. The observation of zero reflection is independent of the reference from which the observation is made. If all the energy in the incident ray enters the refractive medium, no observer in any frame can see a reflected ray.

Figure 1:
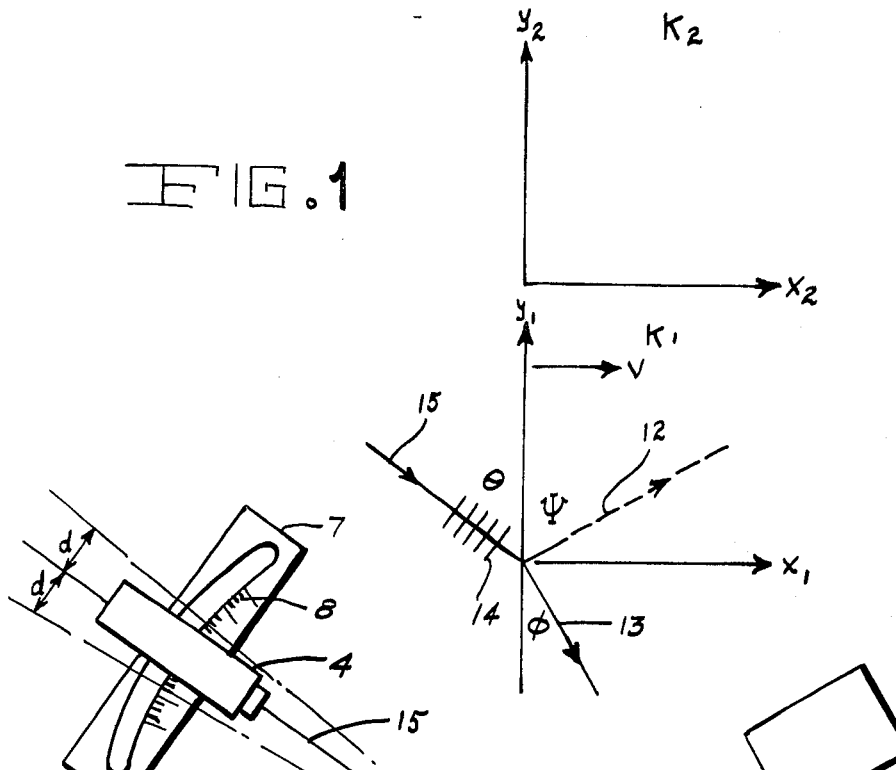
FIG. 1 is a vector diagram illustrating the Brewster Angle condition.

The various quantities are shown in FIG. 1. Incident light beam 15 having a polarization indicated by lines 14 is completely absorbed in the refracting medium as beam 13. Dashed line 12 indicates the would-be reflected beam (if the Brewster angle conditions were not met). The refractive medium occupies the region $y < 0$ and is at rest in the inertial frame $K_1$. The frame $K_1$ moves with velocity v in the positive x direction with respect to frame $K_2$. Significant angles are designated as:

$\theta$ angle of incidence
$\psi$ angle of would-be reflection
$\phi$ angle of refraction.

The subscripts 1 and 2 refer to quantities as measured by observers at rest in frames 1 and 2 respectively. For simplicity the incident ray is propagated in vacuo (the region $y > 0$). The refractive medium is idealized by taking its dielectric constant n to be isotropic as for glass. As a further simplification the medium is considered to be non-dispersive so that the phase velocity and ground velocity are equal. The idealizations simplify but do not change the conclusions hereinafter derived.

In frame $K_1$, the proper frame of the refractive medium, the condition for zero reflection is $$\tan \theta_1 = n_1, \tag{1}$$

or equivalently, $$\theta_1 + \phi_1 = \pi/2. \tag{2}$$

Equation (2) follows from Snell's law, $$\sin \theta_1/\sin \phi_1 = n_1. \tag{3}$$

Because of Equation (2), the following equation can be written $$\tan \theta_1 \tan \phi_1 = 1. \tag{4}$$

In order to calculate the equivalent of Equation (4) for an observer at rest in frame $K_2$ the Lorentz transformations are applied to the wave number 4-vector $(k, i\omega/c)$, where k is the wave number in 3-space and $\omega$ the angular frequency. The phase velocity is always given as $\omega/k$. In vacuo the phase velocity is $$\omega/k = c, \tag{5}$$

and in the medium it is $$\omega/k = c/n. \tag{6}$$

The Lorentz transformations for $k_1$ and $k_2$ are $$k_{x_2} = \gamma(k_{x_1} = i\beta k_{t_1})$$
$$k_{y_2} = k_{y_1}; \, k_{z_2} = k_{z_1} = 0$$
$$k_{t_2} = \gamma(k_{t_1} + B k_{x_1}), \tag{7}$$

where
$$k_t = i\omega/c$$
$$\beta = v/c$$
$$\gamma = (1 - \beta^2)^{-1/2} \tag{8}$$

In terms of $k_x$, $k_y$, and $\omega$, the transformations are
$$k_{x_2} = \gamma(k_{x_1} + v\omega_1/c^2)$$
$$k_{y_2} = k_{y_1}$$
$$\omega_2 = (\omega_1 + vk_{x_1}). \tag{9}$$

The results of the transformations are shown in the following Table 1.

TABLE 1

Ray Parameters in Two Inertial Frames*

| | $K_1$ | | | $K_2$ |
|---|---|---|---|---|
| Incident Ray | $(K_{x_1})_i = (k_1)_i$ | | $(k_{x_2})_i$ | $= \gamma(k_1)_i$ |
| | $(k_{y_1})_i = -(k_1)_i \cos\theta_1 / \sin\theta_1$ | | $(k_{y_2})_i$ | $(\sin\theta_1 + v/c) = (k_{y_1})_i = -(k_1)_{i \cos} \theta_1$ |
| Refracted Ray | $(k_{x_1})_r = (k_1)_r$ | | $(k_{x_2})_r$ | $= \gamma(k_1)_r$ |
| | $(k_{y_1})_r = -(k_1)_r \cos\theta_1/\cos\phi_1 \sin\phi_1$ $= -(k_1)_r$ | | $(k_{y_2})_r$ | $(\sin\phi_1 + v/cn) = \gamma(k_1)_r$ $(\cos\phi_1 + v/cn) = -(k_1)_r \cos\theta_1 = -(k_1)_r \sin\theta_1$ |
| Angle of Incidence | $\tan \theta_1 = (k_{x_1})_i / (k_{y_1})_i$ | $-\tan \theta_2$ | | $= (k_{x_2})_i / (k_{y_2})_i$ $= \gamma \tan \theta_1$ $(1 + v/c \sin \theta_1)$ |
| Angle of Refraction | $\tan \phi_1 = (k_{x_1})_r /(k_{y_1})_r$ | $-\tan \phi_2$ | | $= (k_{x_2})_r / (k_y)_r$ $= \gamma \tan \phi_1$ $[1+v/(cn \sin \phi_1)]$ $= \gamma \cot \theta_1$ $(1 + v/c \sin \theta_1)$ |

*The quantities in $K_2$ have been obtained from those in $K_1$ through Lorentz transformations. The subscript $i$ refers to the incident ray, and the subscript $r$ to the refracted ray.

The equivalent of Equation (4) for the frame $K_2$ is
$$\tan \theta_2 \tan \phi_2 = \gamma^2 \tan \theta_1 \cot \phi_1$$
$$[1 + v/(c \sin \theta_1)]^2$$
$$= \gamma^2 [1 + v/(c \sin \theta_1)]^2. \tag{10}$$

For $v \ll c$, Equation (10) may be approximated as $\tan \theta_2 \tan \phi_2 \approx 1 + 2v/(c \sin \theta_1) + \ldots \tag{11}$ Equation (11) differs from Equation (4) by a first-order term in 2( ). Moreover, over, since $\sin \theta_1$ is always less than or equal to unity, its presence in the denominator ensures that $2(v/c)$ is the minimum value of the deviation. By applying the invariance of zero reflection for Brewster angle incidence a first-order effect in $v/c$ is arrived at.

Figure 2:
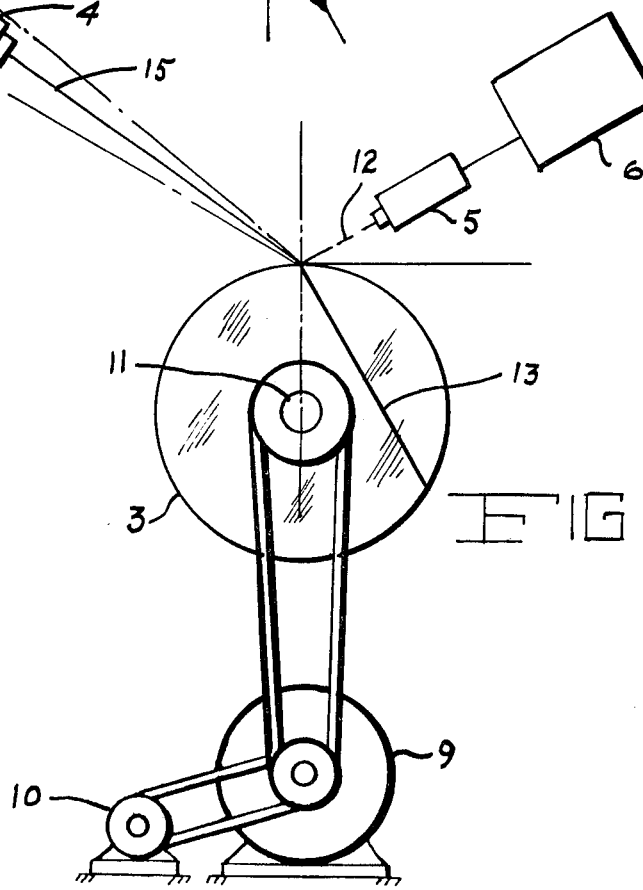
FIG. 2 is an illustration of the organization of components necessary to practice the present invention.

Referring now to FIG. 2, there is illustrated thereby an organization of components adapted to operate in accordance with the principle of the invention. Disc member 3 of refractory material is mounted on rotatable shaft 11. Shaft 11 can be rotated by any suitable means such as variable speed motor 9 and the belt and pulley system shown. A tachometer 9 is provided to measure the velocity of motor 9. Light beam 15 is provided by light source 4 which is mounted on frame member 7 and can be moved in the arc shown. Frame member 7 has calibration marks 8 suitable to accurately indicate any movement of light source 4. Photodetector 5 is positioned to detect reflected light 12 when such reflection occurs. The output of photodetector 5 is fed to null detector 6. Although only rudimentary elements are shown to better demonstrate the principle involved more sophisticated apparatus is, of course, within the purview of the invention and would normally be used in practice.

In operation as a device for measuring angular velocity disc member 3 is initially stationary and light source 4 is positioned such that light beam 15 impinges on the peripheral surface of the disc at an angle that satisfies the Brewster angle requirement for no reflection. Photodetector 5, of course, has no output and null detector 6 indicates a null condition. Subsequent rotation of rotatable shift 11 by motor 9 violates the Brewster angle requirement causing reflected light 12 to activate photodetector 5. The output of photodetector 5 is indicated by null detector 6. Light source 4 is then moved a distance $d$ or $d'$ that results in the Brewster angle requirement again being met with the consequent elimination of reflected light 12. In practice it is merely necessary to move the light source back and forth until null detector 6 indicates a null condition. The distance light source 4 has been moved is determined from calibrated scale 8 and is a measure of the angular velocity of the disc member (and the rotatable shaft).

When used as a device for determining light beam incidence angle the light source 4 is in a fixed position and disc member 3 and its associated components are remotely located (in a spacecraft, for instance). Disc member 3 is again initially stationary and positioned such that light beam 15 intercepts its peripheral surface at the Brewster angle. As long as the attitude of the equipment remains the same with respect to the light beam, no reflected light will be detected by photodetector 5 and null detector 6 will indicate a null condition. When the attitude changes, however, and the light beam strikes the disc at a new angle reflected light 12 occurs and the null detector indicates that deviation has occurred. Disc member 3 is then rotated at various velocities until a velocity that eliminates the reflected light is achieved. This velocity is indicated by tachometer 10 and is a direct measure of the angle of deviation from the fixed light beam 15.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. The method of measuring attitude relationship of a moving vehicle with respect to a fixed light beam comprising the steps of:

providing a light source adapted to project a light that is linearly polarized in its plane of incidence, providing in said vehicle a rotatable disc member of refractory material, a portion of the periphery of said disc member being in intercepting relationship with said light beam at an angle whose tangent equals the relative index of refraction of the refractory material, providing means proximate to the point of interception of said beam for detecting reflected light therefrom, rotating said disc at a velocity effective to eliminate any detected reflected light, measuring said disc velocity, and converting said measured velocity value into angle value indicative of attitude deviation from said light beam.

* * * * *